May 6, 1930.  J. DUMOND  1,757,009
COUPLING
Filed Nov. 15, 1928
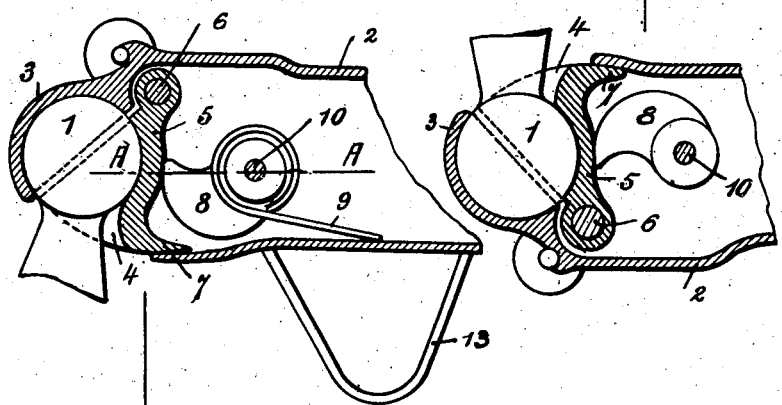
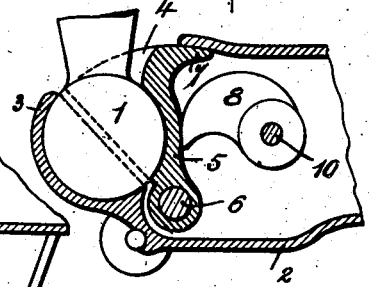
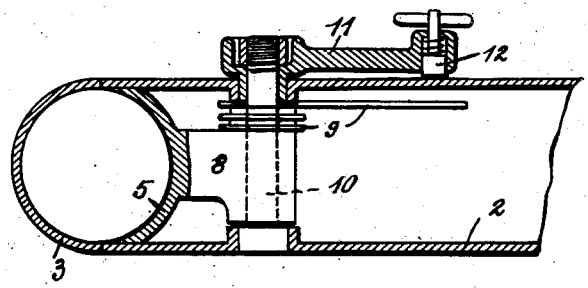
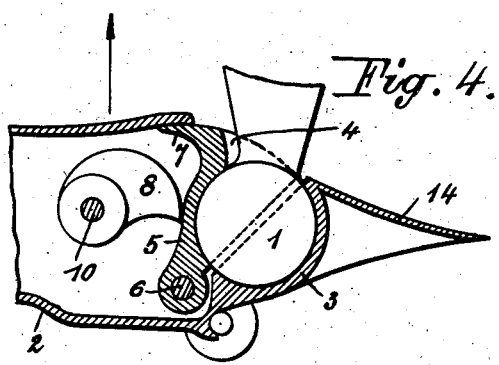
INVENTOR
J. DUMOND Patented May 6, 1930

1,757,009

UNITED STATES PATENT OFFICE

JULIEN DUMOND, OF ST.-JULIEN-DU-SAULT, FRANCE

COUPLING

Application filed November 15, 1928, Serial No. 319,651, and in France November 28, 1927.

The present invention relates to an arrangement for the coupling of two elements which are susceptible of relative angular displacements. The said arrangement is essentially characterized by the fact that one of the said elements is terminated by a ball which may engage and be held between two hemispherical sockets mounted on the other element. One of the said sockets is stationary and carries the joint of the other socket which may be given an angular motion on an axle situated in a diametrical plane pertaining to the cooperating socket. The movable socket is further combined with means for the automatic closing of the device thus formed, and such means may be controlled from the exterior for the opening of the grip device by the angular motion of the pivoted socket.

In the accompanying drawings and by way of example:

Figs. 1 and 2 show in vertical section, and in horizontal section on the line A—A of Figure 1, a constructional form of the coupling arrangement according to the present invention.

Figs. 3 and 4 show two other forms of the arrangement represented in Figures 1 and 2.

As shown in the preceding considerations, one of the parts to be coupled carries a ball 1 through the medium of a fitting of any kind. The corresponding part is provided with a case 2 at whose end is mounted a hemispherical socket 3. The diametrical plane bounding the said socket is inclined from the vertical. The said case is pierced with an aperture 4 and is adapted to receive in the interior movable hemispherical socket 5 in whose wall is formed an aperture for the insertion of the fitting carrying the ball 1. The said socket 5 is pivoted to the axle 6 mounted on the case 2, so that it may move from or towards the stationary socket 3 by angular displacements. When the latter is brought near, the ball 1 of the other part can be seized between the fixed and movable sockets 3—5 after the manner of a grip. The fitting carrying the ball 1 is inserted through the apertures in the movable socket 5 and its containing case. The socket 5 is guided in its motion by the engagement of its edge and its rear projecting part with the corresponding wall of the case 2.

The movable socket can be held in the closing position by the action of a fastening cam 8 urged by the torsion spring 9. The pivot axle 10 of the cam 8 is mounted on the case 2, and to said axle is keyed at the exterior an operating lever 11, which carries a latch by which it can be fastened to the case 2. The said latch may consist of an elastic locking bolt cooperating with teeth of a sector or perforations in the corresponding wall of the case, or the like.

The operation is as follows:

In the position herein represented, the movable socket 5 is held by the action of the spring 9 controlling the cam 8, so that the ball 1 is held fast between the two sockets 3—5 forming a grip. To release this device, the lever 11 is operated. The cam will thus be separated from the movable socket 5 which becomes free and the ball 1 can be inserted into or removed from this member of the coupling device. When the lever 11 is released, the spring 9 brings back the cam 8 into the closing position in which the movable socket 5 is held fast. The lever which has been thus moved will be then held in its new position by the automatic action of the catch 12, which it carries, so that even in case of rupture of the spring 9, the apparatus cannot improperly come apart.

The said apparatus provided for the following conditions:

A.—The successive coupling of the part carrying the case 2, to several parts comprising solely a ball 1, which permits for instance the coupling of a trailer to different tractors, or inversely.

B.—To apply the effort of traction to the hemispherical part 3 secured to the case 2.

C.—To avoid all jarring or noise, since the coupling is effected without play. In fact, the wear is automatically taken up by the angular displacement of the cam 8 by the action of the spring 9.

D.—The construction of a coupling device in which the parts thus coupled may be given relative angular displacements.

E.—To modify the relative positions of the parts of the said coupling device.

In fact, the case 2 may be so disposed that its aperture 4 can be directed towards the ground (Fig. 1), and the engagement with the ball 1 is effected by the descent of the case 2. In this event, no dirt or grit can collect in the interior of the sockets 3 and 5. A skid 13, disposed under the case 2, holds this latter in the raised position with reference to the ground, when the corresponding part to be coupled, such as the wagon pole of the trailer, is left free. The case 2 may however be inverted (Fig. 3) and the insertion of the ball 1 between the two sockets 3—5 is effected by raising this part of the coupling device. By this latter disposition (the case 2 being herein applied to the tractor Figure 4) may serve to produce an automatic coupling apparatus, by adding a projection or inclined plane 14 preceding the stationary socket 3′. It will suffice, after engaging the ball 1, to release the lever 11 in order to close together the sockets 3—5 upon the said ball, as above indicated.

I claim:

1. A coupling including an element formed with a ball terminal, a cooperating element formed as a hollow fitting and provided with an opening for the entrance of the ball terminal and with a portion rigid with the fitting to partly embrace the ball terminal, a movable section mounted wholly within the fitting and formed to partly embrace the ball terminal, a spring-operated cam mounted within the fitting to hold the movable section in operative relation, and means operative from beyond the fitting for moving the cam to inoperative position.

2. A coupling including an element formed with a ball terminal, a cooperating element formed as a hollow fitting and provided with an opening for the entrance of the ball terminal and with a portion rigid with the fitting to partly embrace the ball terminal, a movable section mounted wholly within the fitting and formed to partly embrace the ball terminal, a spring-operated cam mounted within the fitting to hold the movable section in operative relation, and means operative from beyond the fitting for moving the cam to inoperative position, said movable section having a lip arranged for guiding cooperation with the wall of the fitting.

3. A coupling including an element formed with a ball terminal, a cooperating element formed as a hollow fitting and provided with an opening for the entrance of the ball terminal and with a portion rigid with the fitting to partly embrace the ball terminal, a movable section mounted wholly within the fitting and formed to partly embrace the ball terminal, a spring-operated cam mounted within the fitting to hold the movable section in operative relation, means operative from beyond the fitting for moving the cam to inoperative position, and means locking said operative means in desired position.

In testimony whereof I have signed my name to this specification.

JULIEN DUMOND.